(No Model.)

W. E. LOMBARD.
PROPORTIONAL CALIPERS.

No. 345,978. Patented July 20, 1886.

WITNESSES:
Robert B. Edes.
N. C. Lombard.

INVENTOR:
Walter E. Lombard.

UNITED STATES PATENT OFFICE.

WALTER E. LOMBARD, OF SOMERVILLE, MASSACHUSETTS.

PROPORTIONAL CALIPER.

SPECIFICATION forming part of Letters Patent No. 345,978, dated July 20, 1886.

Application filed April 19, 1886. Serial No. 199,370. (No model.)

*To all whom it may concern:*

Be it known that I, WALTER E. LOMBARD, of Somerville, in the county of Middlesex and State of Massachusetts, have invented certain new and useful Improvements in Calipers, of which the following, taken in connection with the accompanying drawings, is a specification.

My invention relates to drawing-instruments, and particularly to that class of instruments known as "calipers;" and it consists in certain novel constructions, arrangements, and combinations of parts, which will be best understood by reference to the description of the drawings and to the claims to be hereinafter given.

Figure 1:
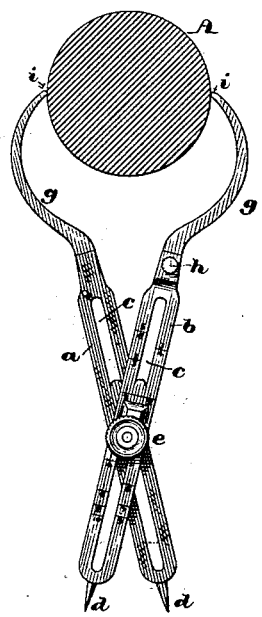
Figure 2:
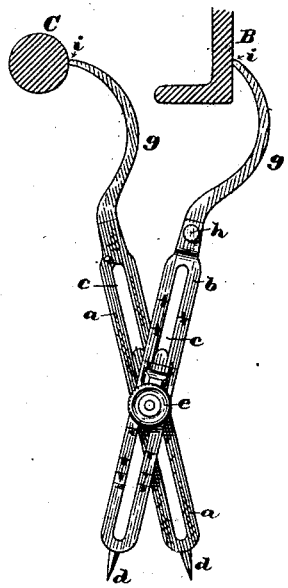
Figure 3:
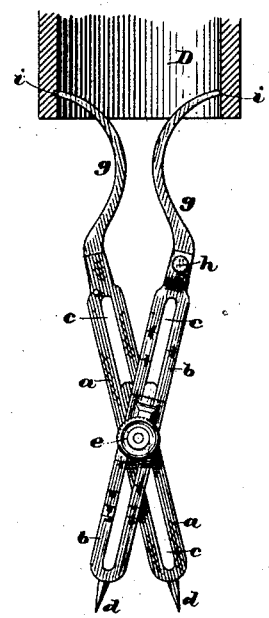
Figure 5:
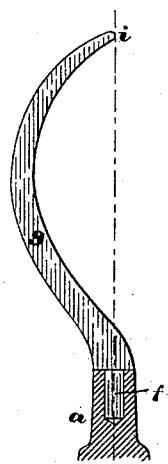
Figure 4:
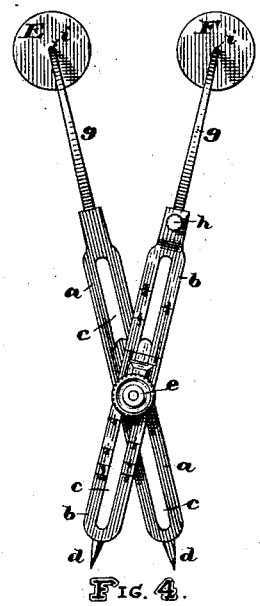
Figure 6:

Of the drawings, Figure 1 represents an elevation of my improved calipers with the curved legs thereof arranged so as to take the outside measurement of a shaft or similar object. Figs. 2, 3, and 4 represent similar elevations of the same, with the curved legs thereof arranged to take various other measurements not adapted to be taken while the legs remain in the position shown in Fig. 1. Figs. 5 and 6 represent enlarged elevations of one of the curved detachable legs, showing a portion of the main portion of said instrument in section and illustrating the method of attaching said arm thereto.

In producing drawings from models and machines to procure the required measurements it is continually necessary to make use of a pair of calipers, and said measurements when thus obtained are taken therefrom by means of dividers or spacers and given to the drawing. This applies to all drawings made full size of the machine, but when the drawing is to be made of a different scale from the machine, as is usually the case in "Patent Office drawings," the measurement which has been obtained from the machine by the calipers is taken therefrom by means of one pair of legs of a pair of proportional dividers and given to the drawing with the opposite pair of legs at an enlarged or a reduced scale, as the case may be. The use of two instruments to get every measurement necessitates much useless labor, and consequently occupies much time, while a drawing made in this manner will not be as accurate as one where the measurements are taken directly from the machine and given to the drawing.

To provide an instrument by which such measurements may be taken from the machine and given directly to the drawing, and thus save much labor and time, is the object of my invention; and to accomplish this object I take two flat bars, *a b*, each provided with a slot, *c*, and a sharp point, *d*, at one end, and connect said bars together by a pivotal clamping device, *e*, in such a manner that said pivot may be adjusted in said slots *c c*, toward or from the ends of said bars *a b*, all substantially the same as in proportional dividers of any well-known construction. The ends of the flat slotted bars *a b* which are farthest from the points *d d* are provided each with a square hole into which the shank *f* of the curved leg *g* is adapted to be inserted, and secured in that position by the screw *h*. The legs *g g* are made of such a curve that the points *i i* thereof are in a line with the center of the shank *f*, so that in whichever way the shank *f* is inserted into the hole provided for it the points *i i* will always come to the same position, as will be seen by reference to the drawings.

By making the curved legs *g g* detachable and movable about their axes almost any measurement required may be readily taken, as will be seen by reference to the drawings, in which, in Fig. 1, the legs *g g* are in a position to take the outside measurements of such objects as the shaft A, while by simply changing one of said arms *g* to the position shown in Fig. 2 the distance between the outside of the frame B and the rod C may readily be obtained, and by changing the other leg *g* to the position shown in Fig. 3 the instrument is adapted to take inside measurements of the tube D, &c.

When it is desired to get measurements between the centers of two shafts, as the shafts E and F, shown in the drawings, the legs *g g* must be placed in a position at right angles to their former position, as shown in Fig. 4, and in this position the instrument is adapted to take any measurement which might be obtained by a pair of proportional dividers of the usual construction.

The holes in which the shanks *f f* are inserted are made slightly inclined toward each other, so that when the curved legs $g\ g$ are in place the points $i\ i$ thereof will be as near together as they can be and still have room to pass each other, all as shown in Fig. 6.

The shanks $f\ f$ may be either square or round, or round with flattened sides, and they may be secured in position by the screws $h\ h$, or said screws may be dispensed with without altering the principles of my invention.

What I claim as new, and desire to secure by Letters Patent of the United States, is—

1. A pair of calipers composed of two bars secured together by an adjustable pivot, each of which bars is curved at one end and provided at the other end with a prick-point.

2. A pair of calipers composed of two bars secured together by an adjustable pivot, each of which is pointed at one end, and provided at the other end with a detachable curved leg adapted to be secured thereto in two or more positions about the axis of its shank.

3. A pair of calipers composed of two bars, each slotted for the greater part of its length and pointed at one end, two curved legs adapted to be secured in different positions to the opposite ends of said bars, and a device adjustable in said slots, by which said bars are pivoted together and clamped in any desired position.

4. A pair of calipers provided with two curved legs by which the measurement of an object may be taken, and other legs adjustably connected to the first to reproduce said measurement at different scales.

In testimony whereof I have signed my name to this specification, in the presence of two subscribing witnesses, on this 18th day of March, A. D. 1886.

WALTER E. LOMBARD.

Witnesses:
N. C. LOMBARD,
ROBERT B. EDES.